Patented May 11, 1937

2,079,701

UNITED STATES PATENT OFFICE 2,079,701

PROCESS FOR MAKING SAFETY GLASS

Brook J. Dennison, New Kensington, Pa., assignor to Pittsburgh Plate Glass Company, a corporation of Pennsylvania No Drawing. Application February 25, 1936, Serial No. 65,733

4 Claims. (Cl. 49—81)

The invention relates to a process of making safety glass in those cases in which the interlayer or reinforcing comprises a sheet of synthetic resin plasticized to the point where it is relatively soft and flexible. One example of an interlayer of the kind specified, is polymerized incomplete vinyl acetal resin containing from 25 to 45 per cent of plasticizers, such as diethyl phthalate, dimethyl phthalate or triglycol dihexoate. While an interlayer of this character has marked advantages when used in safety glass, it also presents certain difficulties in handling, as compared with the hard, smooth reinforcing sheets heretofore used. The plasticized resin sheet resists sliding movement over the glass sheets when matched therewith at room temperature, making it difficult to slip the sheets one over the other in matching, so that the operator must carefully place the sheets one upon the other in their proper relative positions, instead of merely assembling them without regard to position and then lining them up properly by pressure applied at the edges, as is the practice with cellulose plastic sheets or the like. Further, the soft plastic sheet has a tendency to entrap air between its surface and the surfaces of the glass sheets which causes bubble defects when the assembly is laminated under heat and pressure. Difficulty is also experienced in passing the soft plastic sheets through a washer due to its tendency to deform under the action of the washer elements. The object of the present improvement is to overcome the difficulties above recited and to so treat the sheet that it becomes relatively hard and stiff, permitting it to be washed and matched with the same ease as the cellulose plastic sheets heretofore used, and obviating the difficulty as to entrapped air. Briefly stated, this result is accomplished by artificially chilling or cooling the resin sheets to a point sufficiently below room temperature that they become relatively stiff and hard.

The temperatures required in order to accomplish the desired result depends upon the character of the resin and the amount of plasticizer therein. For example, a composition comprising 69 parts vinyl acetal and 31 parts triglycol dihexoate requires a temperature of from 50 to 60 deg. F. in order to give the best results. Plastic containing diethyl phthalate requires a slightly lower temperature.

The process of cooling is also of advantage in connection with the step of cleaning the plastic by washing preliminary to using it in safety glass, as washers used to clean plastic at the present time are constructed to handle plastic which is fairly rigid. Cellulose nitrate and acetate plastics, when run through an area in which sprays of water are directed against the plastic, are rigid enough to continue in a straight path without bending to the rolls through which the plastic passes. The plasticized resins, however, are too soft to run through the washers when warm water is used and in most cases when tap water is used. This difficulty is overcome by passing the sheets through cold water before washing, or in using cold water in the washer with suitable means for refrigerating and recirculating. Under these conditions, the step of washing performs the function of chilling the sheets so that no further treatment is necessary in order to provide the hardness and stiffness required in the laminating operation as heretofore explained.

After the glass and resin sheets are assembled as heretofore explained, the assembly is run through several pairs of nipper rolls or otherwise pressed to expel the air between the sheets. It is then preliminarily laminated under heat and pressure by means of a diaphragm press, to which heat is applied or by sending between a series of heated nipper rolls. The pressing is finally completed by the hydraulic method of the Sherts and Hamill Patent No. 1,781,984, dated November 11, 1930, the sandwiches being placed in an autoclave and exposed to a pressure of about 150 pounds per square inch and to a temperature of from 225 to 250 deg. F.

What I claim is:

1. A process of laminating sheets of glass with a sheet of resin containing an amount of plasticizer which renders the sheet relatively soft and flexible at room temperatures but non-adherent to the glass sheets at such temperatures, which consists in first cooling the resin sheet to a temperature below room temperatures to stiffen and harden it and to facilitate the matching of the assembly and avoid the entrapping of air therein, placing the resin sheet between a pair of glass sheets and completing the lamination by applying heat and pressure to the assembly to cause the resin sheet to adhere to the glass sheets.

2. A process of laminating sheets of glass with a sheet of resin containing an amount of plasticizer which renders the sheet relatively soft and flexible at room temperatures but non-adherent to the glass sheets at such temperatures, which consists in first cooling the resin sheet to a temperature below room temperatures to stiffen and harden it and to facilitate the matching of the assembly and avoid the entrapping of air therein, placing the resin sheet between a pair of glass sheets which have been cooled to a temperature below room temperatures, and completing the lamination by applying heat and pressure to the assembly to cause the resin sheet to adhere to the glass sheets.

3. A process of laminating sheets of glass with a sheet of resin containing an amount of plasticizer which renders the sheet relatively soft and flexible at room temperatures but non-adherent to the glass sheets at such temperatures, which consists in first cooling the resin sheet until it becomes relatively stiff and hard to facilitate matching and avoid the entrapping of air, placing the resin sheet between a pair of glass sheets and completing the lamination by applying heat and pressure to the assembly to cause the resin sheet to adhere to the glass sheets.

4. A process of laminating sheets of glass with a sheet of resin containing an amount of plasticizer which renders the sheet relatively soft and flexible at room temperatures but non-adherent to the glass sheets at such temperatures, which consists in first cooling the resin sheet until it becomes relatively stiff and hard, by passing it through a washer using cold water so that the sheet is maintained in its relatively stiff, hard condition so that it may be readily matched and the tendency to entrap air reduced, placing the sheet between a pair of glass sheets, and completing the lamination by the application of heat and pressure to the assembly.

BROOK J. DENNISON.